United States Patent [19]
Cook

[11] 3,844,582
[45] Oct. 29, 1974

[54] LEVELING AND STABILIZING DEVICE

[76] Inventor: Raymond F. Cook, 3023 Yellowcreek Rd., Bath, Ohio 44210

[22] Filed: Dec. 6, 1972

[21] Appl. No.: 312,608

[52] U.S. Cl.......... 280/150.5, 254/86 H, 280/150 R
[51] Int. Cl. .............................................. B60s 9/10
[58] Field of Search...... 280/150.5; 254/86 H, 86 R; 280/150 A, 150 R; 116/28 R, 34 R

[56] References Cited
UNITED STATES PATENTS

| | | | |
|---|---|---|---|
| 2,322,358 | 6/1943 | Hansen | 254/86 H |
| 2,461,758 | 2/1949 | Moss | 280/150 A |
| 2,555,925 | 6/1951 | Genthe | 254/86 R |
| 2,863,670 | 12/1958 | Larson | 280/150.5 |
| 3,236,501 | 2/1966 | McKay | 254/86 R |
| 3,656,778 | 4/1972 | Bristol | 280/150.5 |

Primary Examiner—David Schonberg
Assistant Examiner—Michael J. Forman
Attorney, Agent, or Firm—Hamilton, Renner & Kenner

[57] ABSTRACT

A leveling and stabilizing device for trailers, campers and related vehicles. One or more skid members are pivotally mounted from supporting frame members on the underside of the vehicle for swinging rearwardly in vertical, longitudinally oriented planes. Corresponding pressure members are operatively connected between each skid member and the corresponding frame member from which it is mounted to depress the skid member in order to elevate one or both sides of the vehicle. An elastic member is also operatively connected between each skid member and the frame members to elevate the skid member. Stops are provided to maintain the dimension between each skid and the roadway over which the vehicle is traveling at a lesser dimension than that between wheel rims on the vehicle and the roadway.

3 Claims, 7 Drawing Figures

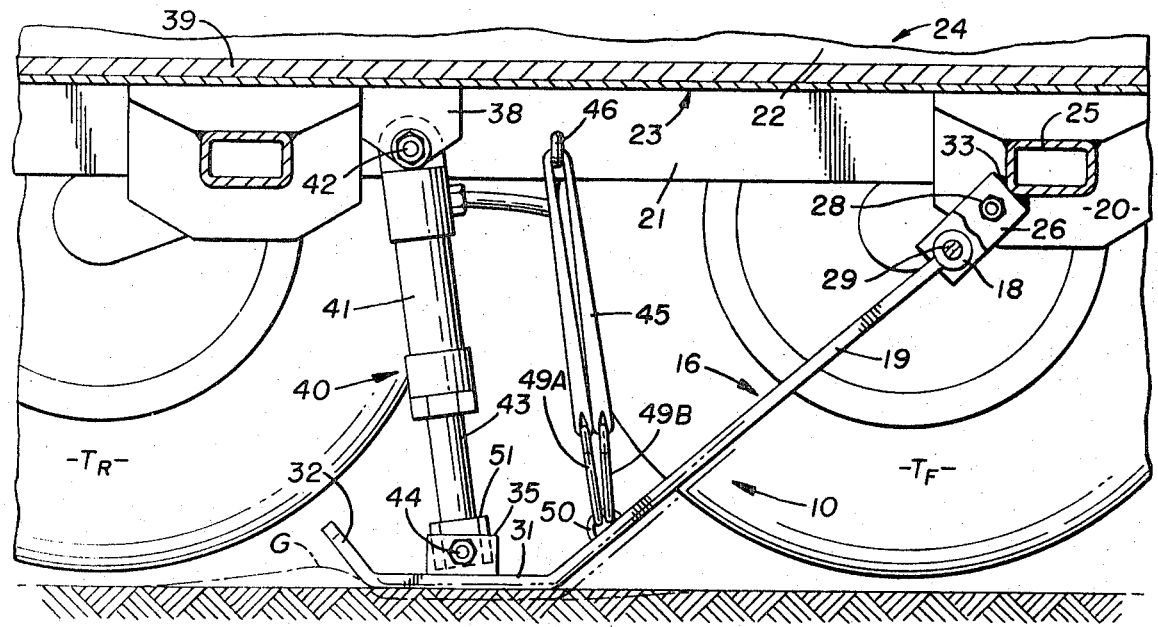
FIG. 4
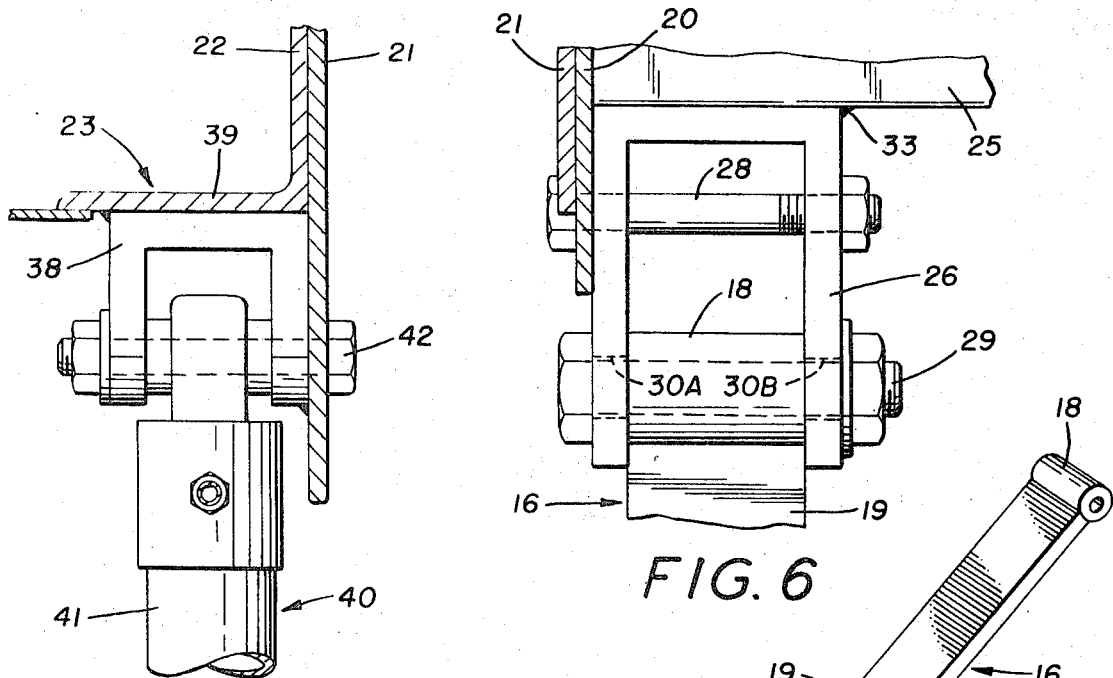
FIG. 5
FIG. 6
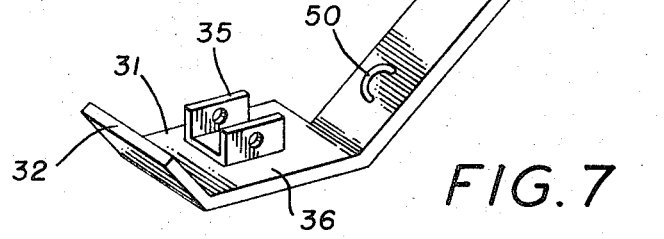
FIG. 7

LEVELING AND STABILIZING DEVICE

BACKGROUND OF THE INVENTION

In general the present invention relates to a device for leveling and stabilizing parked trailers, campers or other recreational vehicles. More specifically, the device allows one to park such a vehicle on sloping terrain and provides the means whereby one person can readily elevate one or both sides of the vehicle without the necessity for assistance and with absolute ease. By thus being permitted selectively to raise one or both sides of the vehicle, it can thereby be leveled about its longitudinal axis not only for the comfort of the occupants but also to permit the effective operation of those accessory appliances which require a level orientation to function properly. The present device also serves to maintain the vehicle in its leveled disposition and further serves, in conjunction with means to level the vehicle about a transverse axis, to stabilize the vehicle against the annoying movement that would be otherwise occasioned as the occupants move to and fro within the vehicle. In addition, the device is capable of completely elevating the wheels in order to permit brake and wheel repairs. The device also signals loss of inflation in a tire before it actually goes flat.

The use of recreational vehicles for traveling and/or camping is becoming more and more popular. The popularity of this activity is largely attributable to the fact that it permits a family to remain in proximity to wooded areas and bodies of water without having to return to a nearby motel, or to their homes, for the night. A second factor contributing to the popularity of recreational vehicles is the freedom one has to go where one pleases, to stop for the night, and then move on. Short, weekend adventures are as readily accomplished in this manner as are longer, vacation trips.

Recently, many coveted wooded areas, preferably near water, have developed into "campsites" where people can park their recreational vehicles. Whether a person using a recreational vehicle selects a private setting or one of the commercial camp-sites, he often must park his vehicle on irregular, or sloping, terrain. In addition to any discomfort accompanying an inclined environment, there is often a problem with the operation of the usual camping equipment. For example, gas stoves and lanterns should be level to operate safely, and refrigeration units require a level disposition to function properly. While some people may choose to level each appliance, it is generally preferable merely to level the vehicle itself.

Basically, there are two types of recreational vehicles— self-propelled and towed. The self-propelled type range in size from small pickup trucks carrying built-on camper units to the larger motor homes. The towed type include the small collapsible campers and the larger camping trailers. With either type, leveling about two axes — about a longitudinal reference axis to effect lateral (roll-type) leveling and about a transverse axis to effect front to rear (pitch-type) leveling — is not only desirable but often necessary. The self-propelled vehicles may require the elevation of one or more wheels at the front and rear to attain both roll- and pitch-type leveling, and even then require the use of additional supports to achieve a desired modicum of stability. The towed vehicles generally have a tongue that may be raised or lowered to attain pitch-type leveling, and one or the other of the rear wheels may be elevated to effect roll-type leveling. Here, too, additional supports have heretofore been employed to achieve stability.

Manufacturers as well as individual owners have devised a host of blocking devices employing the concept of the inclined plane to assist in the leveling operation. Two excellent examples of devices that epitomize the ingenuity that has been directed to the development of suitable blocking devices are found in two recently issued U.S. Pat. Nos. 3,661,229 and 3,684,233. As can be seen by reference to those patents, leveling is effected by driving the lower wheel onto a blocking device. While such an approach has been frequently employed to achieve roll-type leveling, it is not always easy to drive a vehicle onto the blocks and at the same time determine when the vehicle reaches its level disposition about a longitudinal reference axis without the assistance of another person. It should also be appreciated that the extent to which such devices can raise a vehicle is limited to approximately 3 to 4 inches. Moreover, the use of such devices to achieve stabilization of the parked vehicle is virtually impossible because the weight of the vehicle remains supported through the suspension system.

Once the vehicle has been leveled one is still, therefore, generally faced with the problem of stabilizing the vehicle against motion engendered by the normal movement of the occupants. Various bracing devices have been employed toward this end, but probably the most common configuration for a stabilizing device employs a brace carried at the corners of the vehicle that swings laterally downwardly from its stowed to its operative position. After the brace is disposed in its operative position a shaft, which is telescopically received within a sleeve member, is mechanically extended, as by a threaded connection therebetween, to bring a foot on the end of the shaft firmly into ground contact. Such devices do serve as adequate stabilizing arrangements, but they are ineffectual as leveling devices for two primary reasons. First, they are seldom sufficiently rugged to support that portion of the vehicle weight required to be lifted in order to accomplish leveling and second, they are generally positioned to secure maximum stability and can twist the frame of the vehicle if one attempts to support too large a portion of the vehicular weight thereby. Even as purely stabilizing devices, however, these configurations are not without difficulties. Mud, dirt or freezing water thrown from the roads often jam the devices and make raising or lowering difficult, if not impossible. In addition, such stabilizing devices are uniformly oriented in such a way that if one attempts to move the vehicle before the devices are properly stowed, serious damage can be inflicted to the devices themselves or to the vehicle on which they are mounted.

Attempts have also been made to level and stabilize such vehicles by the use of heavy duty jacks applied indiscriminately to that portion of the vehicle which happens to be at the lowest level when it is parked at the desired campsite. Elevating the trailer with jacks has resulted in holes in the floor of the vehicle and twisted frames from improper positioning. Moreover, a precariously balanced trailer can be easily rocked off of the jacks by movement from within the trailer.

While the careful positioning of these devices will level the vehicle it is, to say the least, a time-consuming procedure, often made more difficult by the lack of daylight and presence of inclement weather.

Another peril exists for the camper whose vehicle has dual rear wheels. In the event that one of the wheels is unintentionally deflated while the vehicle is in motion, and without the knowledge of the driver, the friction to which the deflated tire is subjected after even a few miles of continued travel may damage one or both of the tires or produce sufficient heat to cause a fire. Ideally, the driver should be apprised of the deflating, or deflated, tire as soon as possible so that he may stop and change, or repair, the tire. While several such signalling devices are offered on the market, none are known to be utilized as an adjunct to a facile and safe leveling and/or stabilizing device.

SUMMARY OF THE INVENTION

It is, therefore, a primary object of the present invention to provide a device for use with trailers, campers and related vehicles that may be permanently secured to the vehicle for leveling and stabilizing the same when it is parked.

It is another object of the present invention to provide a leveling and stabilizing device, as above, that is capable of elevating at least one wheel at a time completely off the ground.

It is a further object of the present invention to provide a leveling and stabilizing device, as above, that is readily operable by only one person with a minimum expenditure of effort.

It is a still further object of the present invention to provide a leveling and stabilizing device, as above, that is completely safe to itself and to the vehicle on which it is mounted as well as to the operator.

It is an even further object of the present invention to provide a leveling and stabilizing device, as above, that functions to signal the deflation of a tire while the vehicle is in motion and also functions to prevent damage to the vehicle or further damage to the tire in such event.

These and other objects, together with the advantages thereof over existing and prior art forms which will become apparent from the following specification, are accomplished by means hereinafter described and claimed.

In general, a device embodying the concept of the present invention has one or more skid members that are mounted from supporting frame members on the underside of a trailer, camper or related vehicle for swinging rearwardly in vertical, longitudinally oriented planes. Corresponding pressure members are pivotally mounted from supporting frame members on the underside of the vehicle and are operatively connected selectively to depress the skids in order to elevate one or both sides of the vehicle. An elastic member is also operatively commented between each skid and a corresponding supporting frame member to elevate the skid member from the ground when permitted by the pressure members.

One preferred embodiment of a leveling and stabilizing device embodying the concept of the present invention is shown by way of example in the accompanying drawings and described in detail without attempting to show all the various forms and modifications in which the invention might be embodied; the invention being measured by the appended claims and not by the details of the specification.

DESCRIPTION OF THE DRAWINGS

FIG. 4 is an enlarged sectional view, taken substantially along line 4—4 of FIG. 2 and therefore similar to FIG. 3, but depicting the leveling and stabilizing device in its lowered, or leveling, position;

FIG. 5 is an enlarged vertical section taken substantially on line 5—5 of FIG. 3 and depicting, in elevation, the connection of the pressure member to a supporting frame member;

FIG. 6 is an enlarged oblique section taken substantially on line 6—6 of FIG. 3 and depicting, in elevation, the connection of the skid member to a supporting frame member; and, FIG. 7 is a perspective view of the skid member incorporated in the disclosed embodiment of the leveling and stabilizing device.

DESCRIPTION OF THE PREFERRED EMBODIMENT

Figure 1:
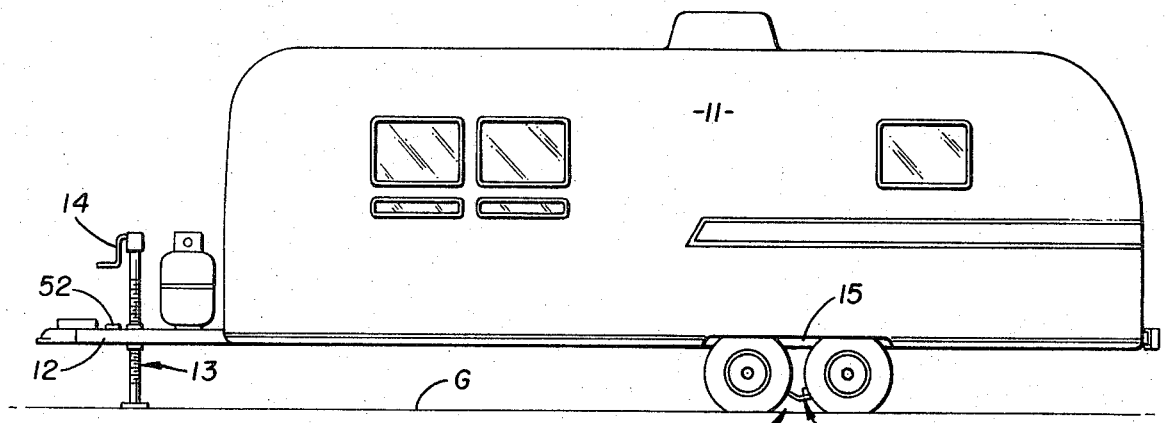
FIG. 1 is a side elevation of a recreational vehicle representative of the towed variety, parked on level ground, depicting pitch-type leveling having been achieved by use of a jack on the tongue of the vehicle and further depicting the location of a leveling and stabilizing device embodying the concept of the present invention mounted between the rear wheels.
Figure 2:
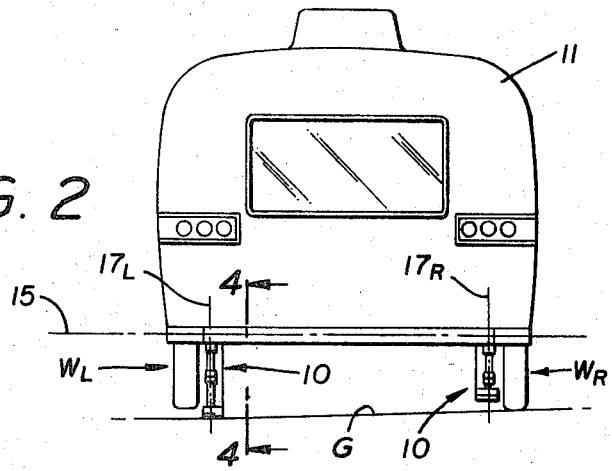
FIG. 2 is a rear view of a recreational vehicle such as is shown in FIG. 1 parked upon laterally sloping ground and depicting the use of the leveling and stabilizing device adjacent each pair of tandem wheels, that device associated with the left pair of tandem wheels having been actuated to attain roll-type leveling of the vehicle.

Referring more particularly to the drawings, a leveling and stabilizing device embodying the concept of the present invention is indicated generally by the numeral 10. As shown in FIG. 2 the device 10 is preferably secured to the underside of a vehicle 11 adjacent the inner side of each pair of tandem wheels, $W_R$ and $W_L$. Although a vehicle having tandem wheels is illustrated, the device 10 works just as efficiently on vehicles having single, or dual, wheels. It is also to be understood that four of the devices 10 could be used for leveling a self-propelled vehicle, such as a truck camper or a motor home, having front and rear axles.

The vehicle 11 illustrated is intended to be towed via an automobile or truck and is therefore equipped with a yoke, or tongue, 12 having a screw jack, or other jack means, 13. The jack 13 is conventionally provided with a hand crank 14 by which one actuates the jack 13 selectively to tilt the vehicle 11 about a transverse axis, such as at 15 (the precise location of the transverse axis 15 being defined by the particular suspension system employed) to effect pitch-type leveling. The jack 13 is also utilized to attain stability in conjunction with the leveling and stabilizing devices 10, as hereinafter more fully explained.

Each device 10 incorporates a skid member 16 that is secured to a frame support in such a way as to be swingable in its own vertical plane $17_R$ and $17_L$ oriented parallel to the longitudinal disposition of the tandem wheels $W_R$ and $W_L$. As best seen in FIG. 6, the skid member is mounted to a frame support through an annular mounting sleeve 18 that is secured to the upper end of a connecting leg 19 which extends downwardly and rearwardly (FIGS. 3 and 4) from the sleeve 18.

A gusset plate 20 is affixed to a bolster plate 21 that reinforces the web 22 of the channel-shaped side member 23 of the vehicle frame 24. The gusset plate 20 and bolster plate 21 cooperate to support the transverse portion 25 of the forward tandem axle. A clevis bracket 26 may be secured to gusset plate 20, as by a first nut and bolt combination 28 or other connecting means such as weldment 33. The skid member 16 is anchored to the clevis bracket 26 by means of a pivot pin in the form of a second nut and bolt combination 29 that extends between registered bores 30A and 30B in the clevis bracket 26. The mounting sleeve 18 is journalled on pivot pin 29.

The end of the connecting leg 19 distal with respect to the mounting sleeve 18 doglegs at approximately 135° into a foot portion 31 that may be somewhat wider than the connecting leg 19, as best seen in FIG. 7, in order to provide the maximum area for ground contact. The foot portion 31, in turn, terminates in an upwardly angled toe portion 32 that further compounds the ground contact area in the event the foot portion 31 indents the ground such that further depression of the skid member 16 is required to elevate, or maintain the desired elevation of, the vehicle, as indicated by the chain line representation in FIG. 4.

A clevis bracket 35 is also secured to the upwardly directed surface 36 on the foot portion 31 of skid member 16. The clevis bracket 35 on skid member 16 is opposed by yet another clevis bracket 38 affixed at the juncture of the lower flange 39 on the channel-shaped side frame member 23 and the bolster plate 21. A pressure member 40 is mounted between the opposed clevis brackets 35 and 38.

The pressure member 40 preferably comprises a hydraulic cylinder 41 that is pivotally mounted from clevis bracket 38, as by a pivot pin in the form of a nut and bolt combination 42, and the piston rod 43 actuated by cylinder 41 is pivotally attached at the opposed clevis bracket 35, as by a pivot pin in the form of a nut and bolt combination 44.

The medial portion of an elastic member 45 in the form of a strap is received through a first anchor ring means 46 projecting from the bolster plate 21 to which it is secured, and the end portions of the elastic member 45 are attached, as by S-hooks 49A and 49B, to a second anchor ring means 50 presented from the connecting leg 19 of skid member 16.

Having now provided the foregoing basic description of the major components in a preferred embodiment of a leveling and stabilizing device 10, a brief description of its operation — during which additional structural details will be identified, as required — will assure a complete understanding of the concept embodied therein.

Figure 3:
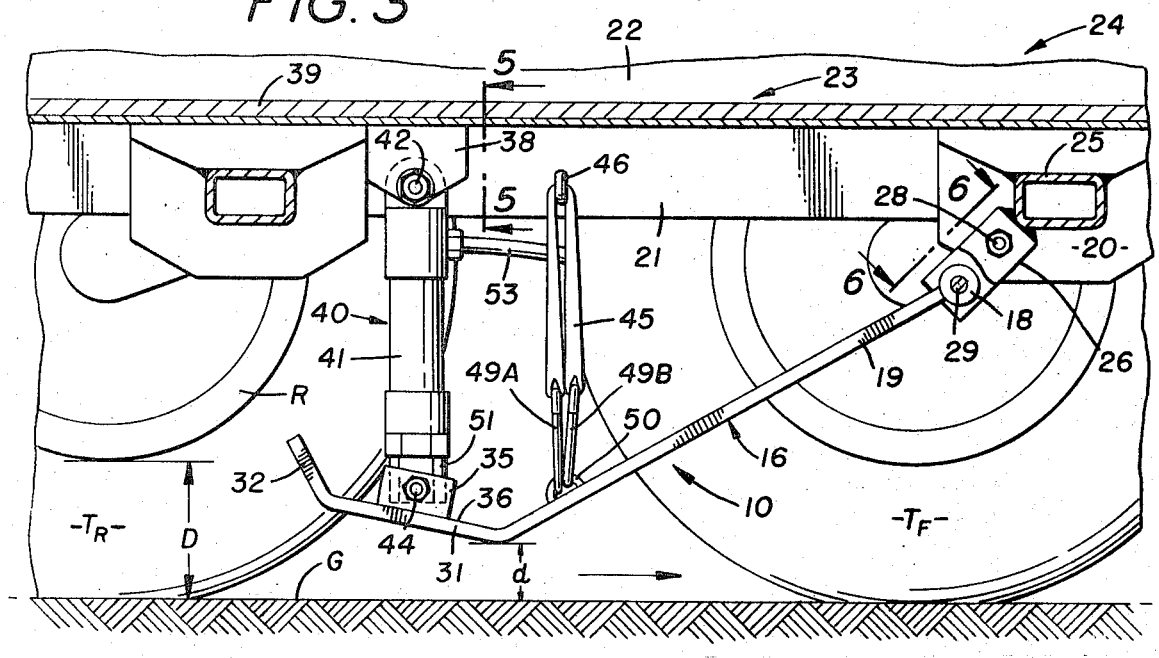
FIG. 3 is an enlarged sectional view, taken substantially along line 4—4 of FIG. 2, depicting the leveling and stabilizing device associated with the left wheel in side elevation but with the leveling and stabilizing device disposed in its raised, or stowed, position.

Referring first to FIG. 3, the device 10 is represented as being in its retracted, or stowed, position — i.e., the position in which it is carried during movement of the vehicle 11. The elastic member 45 maintains the skid member 16 in this position against a deactivated pressure member 40. During forward movement of the vehicle, indicated in the direction of the arrow in FIG. 3, it is seen that the skid member 16 is oriented such that in the event one or both of the tires $T_F$ and $T_R$ in either set of tandem wheels $W_R$ and $W_L$ fail, the vehicle 11 will descend until the foot portion 31 of the adjacent skid member 16 contacts and drags along the roadway G. The noise resulting as the skid member drags along the road signals the driver that one of his tires has at least partially deflated, a condition not always readily discernible from inside the towing vehicle. In addition, so long as the distance $d$ between the roadway G and the lowermost portion of the skid member (when oriented in its stowed position — with the head 51 on piston rod 43 bottomed against cylinder 41) is less than the distance D between the rims R and the roadway G, the drag of the skid member 16 will prevent any undue damage from occurring to the deflated tire or the vehicle due to continued movement thereof with a deflated tire.

When the vehicle 11 is stopped and is to be leveled, the operator may first attain pitch-type leveling by raising or lowering the tongue 12 about the transverse axis 15. This is readily accomplished by manipulation of the hand crank 14 on jack 13, and a bubble or other leveling gauge, not shown, may be mounted on the tongue 12 in proximity to the jack 13, as at 52, so that the operator may visually determine when pitch-type leveling has been achieved.

After initial pitch-type leveling has been accomplished, efforts may be directed toward attaining roll-type leveling by elevating the lowermost side of vehicle 11. Hydraulic fluid is pumped into the cylinder 41 of the appropriate pressure member 40 through a hose 53 from either a hand- or electric-operated pump means, not shown. As the piston rod 43 is extended the skid member 16 rotates about the nut and bolt combination 29, eventually forcing the foot portion 31 into contact with the ground and thereupon elevating that side of the vehicle on which the device 10 being actuated is mounted. As in determining pitch-type leveling, an independent, or combined, bubble or other leveling gauge, not shown, may be employed to indicate when roll-type leveling has been attained.

With the vehicle thus initially leveled about both a longitudinal and transverse frame of reference, that device 10 associated with what was originally the high side of the vehicle may also be actuated so as to remove a substantial portion of the loading from the wheels in order to circumvent the suspension system and thereby support a sizable portion of the vehicular weight by rigid structure extending between the vehicular frame and the ground. This assures that the vehicle is fully stabilized. At this point it may be required to effect a second, minor round of adjustments as to both the pitch-type and roll-type leveling, but once that is accomplished the vehicle is not only fully leveled, it is also fully stabilized.

Because the pressure members 40 may be extended until the wheels on one, or both, sides of the vehicle 11 are completely elevated above the ground, minor repairs to the tires, wheels or brakes may be readily facilitated by use of the device 10.

It should also be appreciated that the configuration of device 10 obviates those difficulties operators have customarily experienced when attempting to utilize devices of prior known constructions that are mounted underneath the vehicle. Regardless of the mud, dirt, ice or other debris accumulated on the device 10 as a result of travel over highways and secondary roads leading to campsites, the device 10 automatically positions itself upon actuation of the pressure member 40; that member easily overcoming any resistance due to deposits of road material.

From the foregoing description it should be obvious to one skilled in the art that the device disclosed herein will facilitate the fast, easy and safe elevation of a trailer, camper or other recreational vehicle for leveling, stabilizing or for minor repairs and while stowed will serve to signal tire failure, deflation and/or prevent damage resulting therefrom as well as otherwise accomplish the objects of the invention.

What is claimed is:

1. A vehicle comprising; a frame having side members, at least one wheel means on each side of the vehicle and supporting said frame, a tongue for drawing the vehicle, jack means mounted on said tongue to effect pitch-type leveling, means pivotally mounting a skid on each said side member adjacent each side wheel means, each said skid being directed downwardly and rearwardly with respect to the vehicle and movable in a vertical plane parallel to said wheel means, a pair of cylinders each operative selectively to extend an individual piston rod, one said cylinder and its associated, individual piston rod being connected between each side member and the skid member pivotally mounted therefrom for moving selective skids to effect roll-type leveling.

2. A vehicle, as set forth in claim 1, in which said wheel means have tires mounted on rims and a head is secured to said piston rod, said head engaging said cylinder to maintain the dimension between said rims and the roadway over which the vehicle is traveling greater than the distance between each said skid and the roadway.

3. A vehicle, as set forth in claim 2, in which further means are provided individually to elevate said skids.

* * * * *